United States Patent [19]

Thrash et al.

[11] Patent Number: 4,643,958

[45] Date of Patent: Feb. 17, 1987

[54] ELECTROLYTE ADDITIVE FOR LITHIUM-SULFUR DIOXIDE ELECTROCHEMICAL CELLS

[75] Inventors: Robert J. Thrash, Carol Stream; John F. Connolly, Glen Ellyn, both of Ill.

[73] Assignee: Amoco Corporation, Chicago, Ill.

[21] Appl. No.: 775,316

[22] Filed: Sep. 12, 1985

[51] Int. Cl.$^4$ .............................................. H01M 6/14
[52] U.S. Cl. ..................................... 429/105; 429/196
[58] Field of Search ............... 429/196, 197, 198, 194, 429/101, 105

[56] References Cited

U.S. PATENT DOCUMENTS 3,567,515 3/1971 Maricle et al. ....................... 429/196
4,403,021 9/1983 Domeniconi et al. .......... 429/196 X
4,515,875 5/1985 Burden et al. ...................... 429/196

Primary Examiner—Donald L. Walton
Attorney, Agent, or Firm—Richard A. Kretchmer; William T. McClain; William H. Magidson

[57] ABSTRACT

A quinone imine dye can be used as an electrolyte additive in lithium-sulfur dioxide electrochemical cells to reduce the polarization which is observed during current flow conditions and, in some cases, to improve electrolyte stability and prevent or reduce the possibility of explosion upon abuse.

18 Claims, 1 Drawing Figure

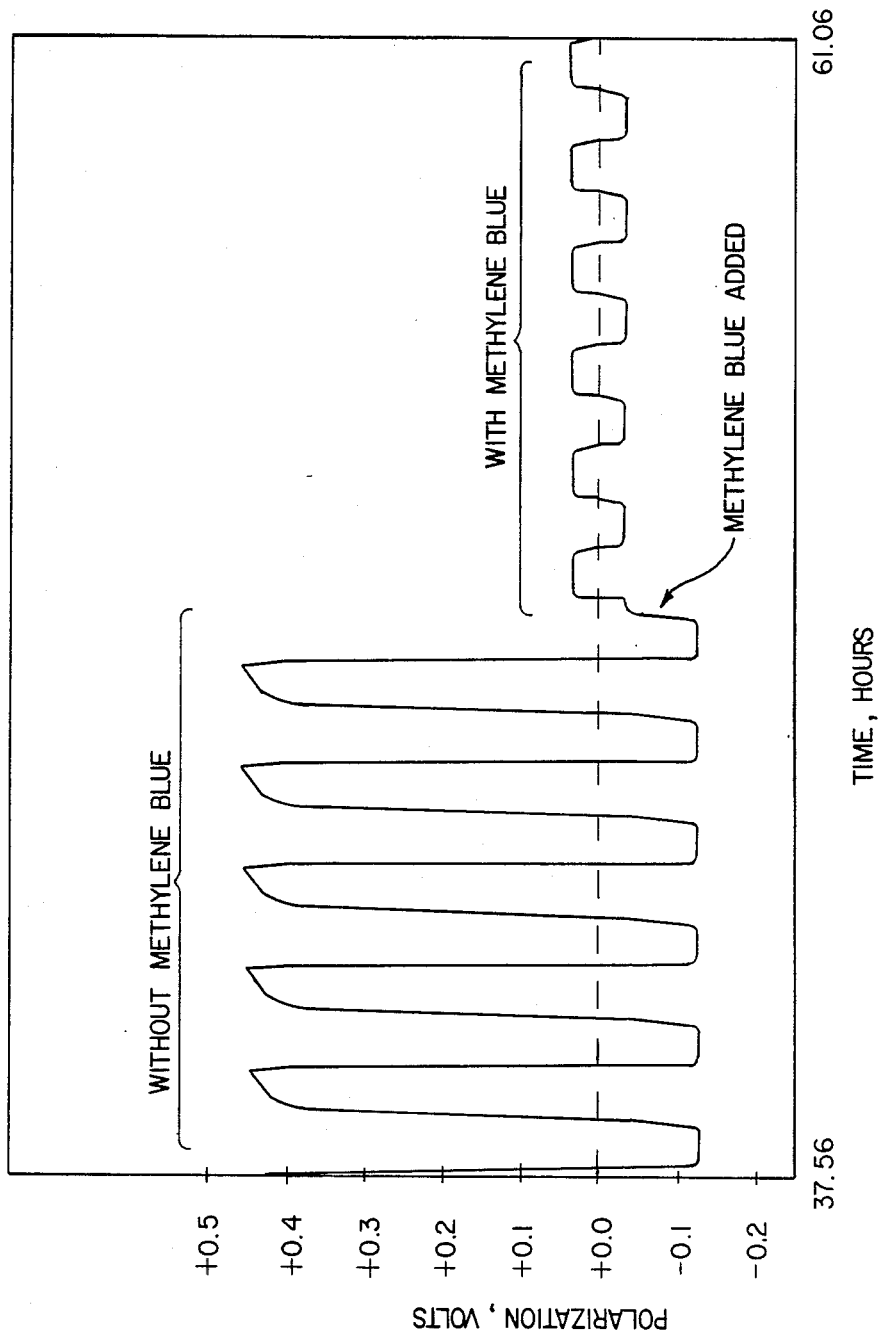

ELECTROLYTE ADDITIVE FOR LITHIUM-SULFUR DIOXIDE ELECTROCHEMICAL CELLS

BACKGROUND OF THE INVENTION

1. Field of the Invention

This invention relates to an improved lithium-sulfur dioxide electrochemical cell. More particularly, it relates to the use of a quinone imine dye as an electrolyte additive in lithium-sulfur dioxide cells.

2. Description of the Prior Art

A substantial amount of interest has recently been centered on the development of ambient temperature, high energy density, electrochemical cells which are light in weight and capable of providing a higher voltage than conventional cells such as nickel-cadmium and lead-acid systems or alkaline cells having zinc anodes. The high energy density cell systems which are currently of interest typically involve the use of active metals (metals above hydrogen in the electromotive series of elements which are unstable in an aqueous environment) as anodes in combination with nonaqueous electrolytes. As used herein, "nonaqueous" is intended to mean substantially free of water. Lithium has been of particular interest as an active metal for such high energy density cells since it is the most active of the metals in the electromotive series and has the ability in an electrochemical cell to provide the highest performance in watt-hours per kilogram of all known active metals.

In conventional electrochemical cells, cathode depolarizers are used in a form which will permit an intimate and maximum contact with an external electrical circuit, such as a set of wires connecting the electrodes of a cell, while also effecting a physical separation of the cathode depolarizer from the anode. In such cells, the cathode depolarizer is generally an insoluble, finely divided solid which is either admixed with or used as a coating over an inert conducting material, such as nickel, graphite or carbon rod, which serves as a current collector or cathode. The physical separation of the cathode depolarizer for the anode is necessary to prevent a direct chemical reaction between the anode material and the cathode depolarizer which would result in self-discharge of the cell.

Until recently, it was generally believed that a direct physical contact between the cathode depolarizer and the anode could not be permitted within an electrochemical cell. It has been discovered, however, that certain cathode depolarizers do not react chemically to any appreciable extent with active metal anodes at the interface between the anode and the cathode depolarizer. Accordingly, with materials of this type, it is possible to construct an electrochemical cell wherein an active metal anode is in direct contact with the cathode depolarizer. For example, U.S. Pat. No. 3,567,515 issued to Maricle et al. on Mar. 2, 1971, discloses the use of sulfur dioxide as a cathode depolarizer in such a cell in combination with a lithium anode.

Japanese patent specification (Kokai) No. 56/35371, published on Apr. 8, 1981, discloses that a quinone imine dye, such as methylene blue, can be used as a cathode depolarizer in an electrochemical cell which contains a lithium anode. Similarly, Japanese patent specification (Kokai) No. 59/68184, published on Apr. 18, 1984, and Tobishima et al. in *Journal of Applied Electrochemistry*, Vol. 14, 721 (1984) have disclosed that a quinone imine dye can be used as a cathode depolarizer in an electrochemical cell which contains a lithium anode and an electrolyte which is composed of a solution of the quinone imine dye and lithium perchlorate in propylene carbonate. However, none of these references contains any suggestion that a quinone imine dye could be utilized in an electrochemical cell except as a cathode depolarizer. More specifically, these references fail to suggest that a quinone imine dye could be advantageously utilized as an electrolyte additive in a lithium-sulfur dioxide electrochemical cell wherein the cathode depolarizer is sulfur dioxide.

Lithium-sulfur dioxide cells which are constructed with conventional electrolytes typically demonstrate substantial deviation from the open-circuit voltage during current flow conditions. This undesirable polarization is particularly serious during charge of rechargeable cells of this type and represents a major obstacle to the construction of a satisfactory rechargeable electrochemical cell which comprises a lithium anode and sulfur dioxide as the cathode depolarizer. The prior art fails to disclose any method for the reduction or prevention of this polarization.

Electrolytes comprised of a solution of lithium perchlorate and one or more tetraalkylammonium perchlorate salts in liquid sulfur dioxide are highly satisfactory for use in rechargeable lithium-sulfur dioxide cells. We have found, however, that these solutions are unstable at high lithium perchlorate and tetraalkylammonium perchlorate salt concentrations. For example, a one molar solution of tetrabutylammonium perchlorate in liquid sulfur dioxide which is saturated with lithium perchlorate typically begins to decompose about one hour after preparation. This decomposition is observed as a yellowing of the solution and the gradual formation of a precipitate. Unfortunately, this decomposition limits the utility of such electrolytes in lithium-sulfur dioxide cells.

In view of the high energy density which is achievable with lithium-sulfur dioxide cells, the undesirable possibility exists that an uncontrolled release of this energy can take place. Indeed, violent explosions have been observed upon overcharge of certain lithium-sulfur dioxide cells. For example, solutions of lithium aluminum chloride ($LiAlCl_4$) and lithium gallium chloride ($LiGaCl_4$) in liquid sulfur dioxide have been disclosed as electrolytes for lithium-sulfur dioxide cells in British patent specification Nos. 2,083,942 and 2,124,821 and in Belgian Pat. No. 895,143. However, rechargeable lithium cells constructed with such electrolytes have been found to explode violently when subjected to overcharge or severe mechanical shock.

SUMMARY OF THE INVENTION

The present invention is directed to the discovery that a quinone imine dye can be used as an electrolyte additive in lithium-sulfur dioxide electrochemical cells to improve the characteristics of these cells. More specifically, it has been found that the use of a quinone imine dye as an additive with conventional electrolytes for such cells serves to reduce the polarization which is observed during current flow conditions and, in some cases, to improve electrolyte stability and prevent or reduce the possibility of explosion upon abuse such as overcharge or severe mechanical shock. The effect of the dye on the polarization of such cells is usually modest upon discharge but is very dramatic during recharge of rechargeable lithium-sulfur dioxide cells. The quinone imine dyes of this invention can be used as electrolyte additives in both rechargeable (secondary) and nonrechargeable (primary) lithium-sulfur dioxide cells.

One embodiment of the invention is a nonaqueous conductive liquid which comprises a solution of at least one quinone imine dye in liquid sulfur dioxide, wherein said dye is free of acidic hydrogen atoms.

Another embodiment of the invention is an electrochemical cell comprising in combination: (a) a lithium anode; (b) a cathode; and (c) a nonaqueous conductive liquid electrolyte which comprises a cathode depolarizer and a minor amount of at least one quinone imine dye, wherein said cathode depolarizer is sulfur dioxide and said dye is free of acidic hydrogen atoms.

A further embodiment of the invention is an electrochemical cell comprising in combination: (a) a lithium anode; (b) a cathode; and (c) a nonaqueous conductive liquid electrolyte which comprises a cathode depolarizer and a minor amount of an organic cation, wherein said cathode depolarizer is sulfur dioxide and said organic cation has the formula:

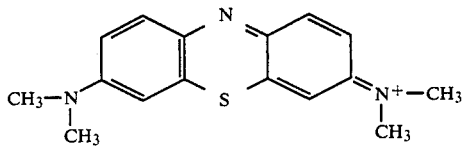

An object of the invention is to provide an improved lithium-sulfur dioxide electrochemical cell.

Another object of the invention is to provide an improved electrolyte for use in lithium-sulfur dioxide cells.

Another object of the invention is to provide an electrolyte additive for lithium-sulfur dixoide cells which will reduce the polarization which is observed during current flow conditions.

A further object of the invention is to provide a stabilized solution of lithium perchlorate and tetraalkylammonium perchlorate in liquid sulfur dioxide.

A still further object of the invention is to provide electrolytes for lithium-sulfur dioxide cells which serve to reduce or prevent the possibility of explosion upon overcharge of such cells.

BRIEF DESCRIPTION OF THE DRAWING

The attached drawing illustrates the ability of methylene blue to reduce the polarization of a rechargeable lithium-sulfur dioxide cell which contains as an electrolyte a 0.02 molar solution of Mn(2,2'-dipyridyl)$_3$ (ClO$_4$)$_2$ in liquid sulfur dioxide which is saturated with LiClO$_4$.

DETAILED DESCRIPTION OF THE INVENTION

We have found that a minor amount of a quinone imine dye can be utilized as an electrolyte additive for lithium-sulfur dioxide electrochemical cells to reduce the polarization that is observed with these cells and, in some cases, to improve the electrolyte stability and reduce or prevent the possibility of explosion upon abuse, such as overcharge or severe mechanical shock. Suitable quinone imine dyes comprise an organic component of the following general formula:

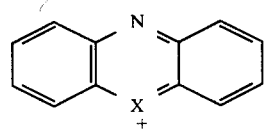

where X is selected from the group consisting of oxygen and sulfur and each of the hydrogens can be replaced by substituents. However, for use in the practice of this invention, the quinone imine dye must also be free of acidic hydrogen atoms. For the purposes hereof, "acidic hydrogen atoms" are those hydrogen atoms which are capable of being readily abstracted by lithium metal. Desirably, the quinone imine dyes have a redox potential in the range from about 2.8 to about 3.05 volts with respect to the Li/Li+ couple. Many of the quinone imine dyes are salts and have an anion associated with the above-described organic component. The nature of this anion is not critical to the practice of this invention so long as it is substantially inert with respect to both lithium metal and sulfur dioxide. Anions, such as fluoride and chloride, which form lithium salts which are relatively insoluble in liquid sulfur dioxide can be used but are not preferred. The preferred anions include perchlorate, tetrafluoroborate, hexafluorophosphate, dithionite, sulfate and bromide.

Preferred quinone imine dyes comprise a component of the formula:

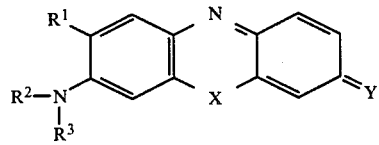

where $R^1$ is selected from the group consisting of hydrogen and alkyl groups of from 1 to 5 carbon atoms; X is selected from the group consisting of oxygen and sulfur; Y is selected from the group consisting of oxygen and —N+R$^4$R$^5$; and R$^2$, R$^3$, R$^4$ and R$^5$ are independently selected from the group consisting of alkyl groups of from 1 to 5 carbon atoms. Examples include, but are not limited to, methylene blue [R$^1$=H, R$^2$ and R$^3$=CH$_3$, X=S, and Y=—N+(CH$_3$)$_2$]; Capri blue [R$^1$=CH$_3$, R$^2$ and R$^3$=C$_2$H$_5$, X=O, and Y=—N+(CH$_3$)$_2$]; and methylene violet [R$^1$=H, R$^2$ and R$^3$=CH$_3$, X=S, and Y=O].

A highly preferred quinone imine dye for use in the practice of this invention contains an organic cation of the formula:

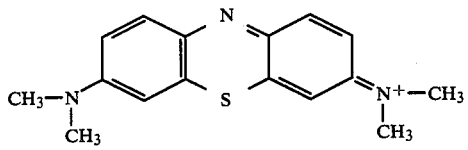

For the purposes hereof, any salt which contains this cation is referred to as methylene blue. As noted above, the nature of the anion associated with this cation is not critical so long as the anion is substantially inert with respect to both lithium metal and sulfur dioxide.

When use in the practice of this invention as an electrolyte additive, the amount of the quinone imine dye will ordinarily be a quantity which is effective to reduce the polarization of the cell during charge or discharge. In a rechargeable cell, the amount of quinone imine dye will preferably be a quantity which is effective to reduce polarization during charge. The amount of dye will typically be enough to yield a concentration in the electrolyte which is in the range from about 0.0001 to about 1.0 molar. A preferred concentration is in the range from about 0.001 to about 0.5 molar and more preferably in the range from about 0.01 to about 0.5 molar.

For reasons that are unclear, a solution comprised of lithium perchlorate and at least one tetraalkylammonium perchlorate dissolved in liquid sulfur dioxide is unstable at high concentrations of these solutes. For example, such a solution which is substantially saturated in lithium perchlorate and about 0.2 molar in tetrabutylammonium perchlorate is unpredicatably unstable and undergoes decomposition on relatively rare and unpredictable occasions. However, when the tetrabutylammonium perchlorate concentration is increased to 1 molar, decomposition reproducibly begins within about 1.5 hours.

One embodiment of the invention involves the use of a quinone imine dye, preferably methylene blue, to stabilize an electrolyte solution which comprises sulfur dioxide, lithium perchlorate, and at least one tetraalkylammonium perchlorate salt. Trace amounts of the quinone imine dye are effective for this purpose. For example, quantities as small as about 5 ppm are effective. However, about 10 ppm or more of the dye is usually preferred. For this purpose, the amount of dye can range from about 5 ppm to about 10 percent by weight.

It has been found that rechargeable lithium-sulfur dioxide cells containing an electrolyte which comprises either a solution of lithium aluminum chloride or lithium gallium chloride in liquid sulfur dioxide are not resistant to abuse, such as overcharge and mechanical shock, and will explode violently when subjected to overcharge or severe mechanical shock. However, the quinone imine dye electrolyte additive of this invention is believed to reduce the sensitivity of these lithium-sulfur dioxide cells to mechanical shock and is also believed to reduce the sensitivity of such cells to overcharge. The amount of dye required to reduce the sensitivity of lithium-sulfur dioxide cells to abuse is typically about the same as that required to reduce the polarization of such cells during charge or discharge.

The lithium metal anode of the electrochemical cell of this invention can be constructed in any of the conventional forms, such as foil, plates, rods, films, powders, compacts or screens, and can be used alone or in combination with either conducting or nonconducting substrates. However, the use of a conducting substrate is not usually preferred since a simultaneous contact of both substrate and active metal with the electrolyte can cause an undesirable self-discharge of the electrode.

The cathode of the electrochemical cell can be constructed of any material which is electrically conducting and is substantially inert to the electrolyte system. In addition, the cathode material is desirably catalytic with respect to electroreduction of sulfur dioxide, the cathode depolarizer. Preferred materials include metals of the platinum group family consisting of platinum, iridium, osmium, palladium, rhodium and ruthenium; carbon in any of its common electrode forms such as sintered, compacted or powdered graphite or carbon rod; iron in its various forms, particularly as stainless steel; titanium, nickel, silver, mercury, lead and gold. Less preferred materials are metals of the families of vanadium, chromium and manganese [Groups 5b, 6b, and 7b of the Periodic Table of Elements (*Handbook of Chemistry and Physics*, 57th ed., 1976-77, p. B-4)]; zirconium, cobalt, copper, zinc, cadmium, germanium, tin, antimony and bismuth; certain nitrides such as boron nitride; and semiconductors such as silicon. These materials can be used in any of the forms which are conventional in the art, such as rods, compacts, powders, pastes and the like.

The electrolyte for use in the electrochemical cell of this invention comprises sulfur dioxide as the cathode depolarizer which is electrochemically reduced at the surface of the cathode during discharge of the electrochemical cell. In the absence of any surface contamination on the lithium anode which can initiate self-discharge, the cathode depolarizer is stable when in contact with this electrode. Although the reasons for this are not well understood, it is believed that the anode is passivated by the formation of a thin film of lithium dithionite ($Li_2S_2O_4$) which then prevents further sulfur dioxide molecules from reaching the lithium anode surface and thereby prevents self-discharge. Nevertheless, this thin film permits electrochemical oxidation and reduction at the lithium anode to take place during operation of the cell by passage of lithium cations through the film. At the same time, sulfur dioxide reduction products are formed at the cathode current collector during discharge of the cell.

The electrolyte for use in the electrochemical cell of this invention preferably comprises liquid sulfur dioxide having dissolved therein at least one, and ordinarily more than one, electrolyte salt which is substantially inert to the other cell components. Such salts are selected and utilized in amounts which are effective to provide an adequate conductivity for efficient operation of the electrochemical cell. Suitable electrolyte salts include, but are not limited to, lithium salts, salts containing metal cation complexes, quaternary ammonium salts, phosphonium salts, pyridinium salts and arsonium salts. However, salts containing metal cation complexes, quaternary ammonium salts and phosphonium salts are preferred.

Various combinations of electrolyte salts comprising at least one material selected from the group consisting of salts containing metal cation complexes, quaternary ammonium salts, phosphonium salts, pyridinium salts and arsonium salts in combination with one or more lithium salts are frequently useful. A preferred combination of electrolyte salts comprises the combination of one or more lithium salts with at least one material selected from the group consisting of salts containing metal cation complexes and quaternary ammonium salts.

Suitable lithium salts for use as electrolyte salts include, but are not limited to, lithium perchlorate, lithium dithionite, lithium sulfate, lithium tetrafluoroborate, lithium hexafluorophosphate, lithium bromide, lithium aluminum chloride and lithium gallium chloride. Preferred lithium salts include lithium perchlorate, lithium bromide, lithium tetrafluoroborate, lithium hexafluorophosphate, lithium aluminum chloride and lithium gallium chloride.

Quaternary ammonium salts are highly suitable for use as electrolyte salts in the practice of this invention.

Preferred quaternary ammonium salts are of the formula:

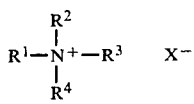

wherein $R^1$, $R^2$, $R^3$ and $R^4$ are independently selected from the group consisting of hydrocarbyl groups containing from 1 to 20 carbon atoms, and $X^-$ is selected from the group consisting of perchlorate, tetrafluoroborate, hexafluorophosphate, dithionite, sulfate, phosphate, chloride, bromide, iodide and fluoride. More preferably, $R^1$, $R^2$, $R^3$ and $R^4$ are independently selected from the group consisting of alkyl groups having from 1 to 10 carbon atoms and $X^-$ is selected from the group consisting of perchlorate, tetrafluoroborate, hexafluorophosphate, dithionite, sulfate and bromide. Examples of suitable quaternary ammonium salts include tetrabutylammonium perchlorate, tetrahexylammonium perchlorate, tetramethylammonium tetrafluoroborate, and tetrapropylammonium hexafluorophosphate.

Salts which contain metal cation complexes are also highly suitable for use as electrolyte salts in the practice of this invention. Suitable members of this group include, but are not limited to [Co(8-hydroxyquinoline)$_2$(NH$_3$)$_2$]$^+$, [Co(8-hydroxyquinoline)$_2$(2,2'-dipyridyl)]$^+$, Mn(2,2'-dipyridyl)$_2^{++}$, Mn(2,2'-dipyridyl)$_3^{++}$, and Mn(1,10-phenanthroline)$_3^{++}$. Of these examples, Mn(2,2'-dipyridyl)$_2^{++}$, Mn(2,2'-dipyridyl)$_3^{++}$ and Mn(1,10-phenanthroline)$_3^{++}$ are particularly preferred.

Phosphonium salts are also suitable for use as electrolyte salts in the practice of this invention, and preferred materials are of the formula:

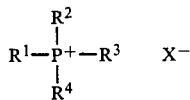

wherein $R^1$, $R^2$, $R^3$ and $R^4$ are independently selected from the group consisting of hydrocarbyl groups containing from 1 to 20 carbon atoms, and $X^-$ is selected from the group consisting of perchlorate, tetrafluoroborate, hexafluorophosphate, dithionite, sulfate, phosphate, chloride, bromide, iodide and fluoride. More preferably, $R^1$, $R^2$, $R^3$ and $R^4$ are independently selected from the group consisting of alkyl groups of from 1 to 10 carbon atoms, and aryl and alkyl-substituted aryl groups of from 6 to 12 carbon atoms; and $X^-$ is selected from the group consisting of perchlorate, tetrafluoroborate, hexafluorophosphate, dithionite, sulfate and bromide. Examples of suitable phosphonium salts include tetrabutylphosphonium tetrafluoroborate, tetraphenylphosphonium perchlorate, and tetraphenylphosphonium hexafluorophosphate.

In addition to the sulfur dioxide cathode depolarizer, quinone imine dye and electrolyte salt or salts, the electrolyte for use in the electrochemical cell of this invention can additionally comprise one or more liquid organic or inorganic solvents or cosolvents which lack acidic hydrogen atoms and contain one or more atoms having at least one unshared pair of electrons. For the purposes hereof, "acidic hydrogen atoms" are those hydrogen atoms which are capable of being readily abstracted by lithium metal. However, strongly basic cosolvents such as amines are not generally desirable.

More specifically, suitable solvents and cosolvents are organic or inorganic liquids which contain at least one element which is selected from Groups 3a, 4a, 5a and 6a of the Periodic Table (*Handbook of Chemistry and Physics*, 57th ed., 1976-77, p. B-4). Preferred elements from this group include, for example, boron, silicon, nitrogen, phosphous, oxygen and sulfur as well as combinations of these elements. Organic solvents which contain two or more atoms of such elements in each molecule are particularly suitable.

Preferred liquid organic compounds for use as a solvent or cosolvent in the practice of this invention include, but are not limited to, trialkyl borates, boronic acid esters, borinic acid esters, tetraalkyl silicates, alkylalkoxyl silanes, nitroalkanes, alkylnitriles, dialkyl amides, lactams, tetraalkyl ureas, acetals, ketals, monocarboxylic acid esters, orthoesters, lactones, dialkyl carbonates, alkylene carbonates, orthocarbonates, monoethers, polyethers, monocarboxylic acid anhydrides, dialkyl sulfates, dialkyl sulfites, alkylene sulfites, and sulfones. Specific examples include triethyl borate, diethyl methylboronate, methyl diethylborinate, tetramethyl silicate, trimethoxymethylsilane, nitroethane, acetonitrile, dimethylformamide, 1-methyl-2-pyrrolidinone, tetramethyl urea, 1,1-diethoxy-ethane, 2,2-dimethyoxypropane, ethyl acetate, trimethyl orthoformate, $\gamma$-butyrolactone, dimethyl carbonate, ethylene carbonate, tetramethyl orthocarbonate, diethyl ether, tetrahydrofuran, ethylene glycol dimethyl ether, acetic anhydride, dimethyl sulfate, dimethyl sulfite, ethylene sulfite, and tetramethylene sulfone.

The following examples are intended only to illustrate the invention and are not to be construed as imposing limitations on it.

EXAMPLE I

A rechargeable electrochemical cell was constructed which contained two porous carbon electrodes (one as a cathode current collector and the other as a reference electrode) and a lithium foil anode which was 1.02 mm thick. Both carbon electrodes were composed of 15% Teflon and 85% Shawinigan black, and the electrode serving as the cathode current collector had a total surface area of 1.4 cm$^2$. The electrolyte was a liquid sulfur dioxide solution which was 0.02 molar in Mn(2,2'-dipyridyl)$_3$(ClO$_4$)$_2$ and saturated in lithium perchlorate. The resulting cell was subjected to a series of charge/discharge cycles where each cycle consisted of a one-hour discharge period followed by a one-hour charge period with a current density of 0.18 mA/cm$^2$ at the cathode current collector. The polarization at the cathode during charge was found to be 460 mV (uncorrected for solution IR drop and measured with stirring of the electrolyte). Subsequently, enough methylene blue (having ClO$_4^-$ as the counterion) was added to the electrolyte to give a methylene blue concentration of 0.05 molar, and the series of charge/discharge cycles was continued. The polarization at the cathode during charge was found to be reduced as a consequence of the methylene blue addition to a value of 50 mV (uncorrected for solution IR drop and measured with stirring of the electrolyte). The effect of the added methylene blue is illustrated in the drawing which sets forth the polarization of the cell as a function of time. It will also be noted from the drawing that the methylene blue also reduces polarization at the carbon current collector during discharge. However, this is, in part, caused by a reduction in the electrolyte solution resistance because of the presence of the methylene blue.

EXAMPLE II

A rechargeable electrochemical cell was prepared as described in Example I except that the electrolyte was a liquid sulfur dioxide solution which was 0.05 molar in $Mn(2,2'\text{-dipyridyl})_3(BF_4)_2$, 0.05 molar in methylene violet, and saturated with lithium tetrafluoroborate. The polarization at the carbon cathode of this cell during charge was found to be less than 60 mV at a current density of 0.14 $mA/cm^2$ (uncorrected for solution IR drop and measured with stirring of the electrolyte).

EXAMPLE III

A rechargeable electrochemical cell was prepared as described in Example I except that the electrolyte was a liquid sulfur dioxide solution which was 1.0 molar in tetrabutylammonium bromide, 0.1 molar in methylene blue (having $Br^-$ as the counterion), and saturated with lithium bromide. The polarization at the carbon cathode of this cell during charge was found to be less than 60 mV at a current density of 0.14 $mA/cm^2$ (uncorrected for solution IR drop and measured with stirring of the electrolyte).

EXAMPLE IV

A rechargeable electrochemical cell was prepared as described in Example I except that the electrolyte was a solution which was 1.5 molar in lithium bromide and 0.5 molar in methylene blue (having $Br^-$ as the counterion) where the solvent was a mixture of about 25% by weight of tetrahydrofuran in liquid sulfur dioxide. The polarization at the carbon cathode of this cell during charge was found to be less than 200 mV at a current density of 0.35 $mA/cm^2$ (uncorrected for solution IR drop and measured without stirring).

EXAMPLE V

A rechargeable electrochemical cell was constructed which contained: (1) a lithium foil anode which was 0.51 mm thick and had a surface area greater than about 80 $cm^2$; and (2) a spiral wound porous carbon cathode current collector which had a surface area of about 88 $cm^2$. The electrolyte was a liquid sulfur dioxide solution which was 0.05 molar in methylene blue (having $ClO_4^-$ as the counterion), 0.05 molar in $Mn(2,2'\text{-dipyridyl})_3 (ClO_4)_2$, and saturated in lithium perchlorate. The resulting cell was initially discharged by the release of sufficient current (758 mAhr) to consume the methylene blue inventory of the cell more than ten times if it were functioning as a cathode depolarizer (assuming a one-electron process, the methylene blue in this cell had a capacity of 66.3 mAhr). The resulting cell was then switched to a series of charge/discharge cycles where each cycle consisted of an eighteen-hour charge period followed by an eighteen-hour discharge period at a total current of 4 mA. The appearance of the electrolyte solution did not change when the charge/discharge cycles were begun (the blue coloration due to the presence of the methylene blue did not change) and a low polarization (less than about 60 mV) was observed at the carbon current collector during charge. These results demonstrate that sulfur dioxide rather than the methylene blue is functioning as the cathode depolarizer.

EXAMPLE VI

A 1.0 molar solution of tetrabutylammonium perchlorate in liquid sulfur dioxide was saturated with lithium perchlorate at room temperature by stirring for one hour at room temperature in the presence of excess lithium perchlorate. Within ten to fifteen minutes after stirring was terminated, a yellow flocculent precipitate started to form at the liquid-vapor interface. Over the next twenty minutes, the precipitate gradually extended down to the bottom of the container. After standing overnight, a fluffy, voluminous, white precipitate, easily distinguishable from undissolved lithium perchlorate, had formed on the bottom of the container and the solution was very yellow in color. After standing for one week at room temperature, the solution had turned to a milky white color. When such a decomposing solution is utilized as an electrolyte in an electrochemical cell which contains a lithium anode and a porous carbon cathode current collector, the open-circuit voltage of the cell is greater than about 4 volts and erratic.

EXAMPLE VII

The procedure set forth in Example VI was repeated except that the sulfur dioxide solution additionally contained 400 ppm of methylene blue (initially having $Cl^-$ as a counterion). The resulting solution (in the presence of undissolved lithium perchlorate) remained stable during a ten-day observation period without any trace of precipitate formation or yellowing. A lithium foil anode and a porous carbon cathode current collector (composed of 15% Teflon and 85% Shawinigan black) were immersed in the solution during the observation period, and the open-circuit voltage of the resulting electrochemical cell was found to be 2.9 volts over the entire ten-day observation period.

EXAMPLE VIII

The procedure set forth in Example VII was repeated except that the amount of methylene blue was 100 ppm. The resulting solution remained stable during a 103-day observation period without any trace of precipitate formation or yellowing.

EXAMPLE IX

The procedure set forth in Example VII was repeated except that the amount of methylene blue was 30 ppm. The resulting solution remained stable during a 102-day observation period without any trace of precipitate formation or yellowing.

EXAMPLE X

The procedure set forth in Example VII was repeated except that the amount of methylene blue was less than 10 ppm. The resulting solution remained stable for 86 days after which precipitate formation and yellowing was observed to begin.

We claim:

1. A nonaqueous conductive liquid which comprises a solution of at least one quinone imine dye and at least one lithium salt in liquid sulfur dioxide, wherein said dye is free of acidic hydrogen atoms.

2. A nonaqueous conductive liquid as set forth in claim 1 wherein said dye comprises a component of the formula:

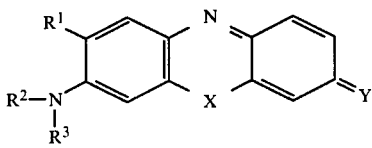

where $R^1$ is selected from the group consisting of hydrogen and alkyl groups of from 1 to 5 carbon atoms; X is selected from the group consisting of oxygen and sulfur; Y is selected from the group consisting of oxygen and $-N^+R^4R^5$; and $R^2$, $R^3$, $R^4$ and $R^5$ are independently selected from the group consisting of alkyl groups of from 1 to 5 carbon atoms.

3. A nonaqueous conductive liquid as set forth in claim 1 wherein said solution additionally comprises at least one lithium-free salt which is selected from the group consisting of salts containing metal cation complexes, quaternary ammonium salts, phosphonium salts, pyridinium salts and arsonium salts.

4. A nonaqueous conductive liquid as set forth in claim 1 wherein said solution additionally comprises an organic liquid cosolvent for said quinone imine dye and lithium salt which is substantially inert to lithium metal and sulfur dioxide.

5. A nonaqueous conductive liquid as set forth in claim 1 wherein the concentration of said dye in the solution is in the range from about 0.001 to about 0.5 molar.

6. An electrochemical cell comprising in combination:
 (a) a lithium anode;
 (b) a cathode; and
 (c) a nonaqueous conductive liquid electrolyte which comprises a cathode depolarizer, at least one dissolved lithium salt and minor amount of at least one quinone imine dye, wherein said cathode depolarizer is sulfur dioxide and said dye is free of acidic hydrogen atoms.

7. An electrochemical cell as set forth in claim 6 wherein said dye comprises a component of the formula:

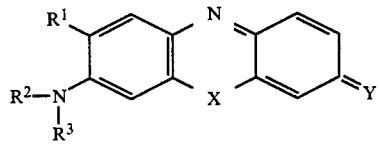

where $R^1$ is selected from the group consisting of hydrogen and alkyl groups of from 1 to 5 carbon atoms; X is selected from the group consisting of oxygen and sulfur; Y is selected from the group consisting of oxygen and $-N^+R^4R^5$; and $R^2$, $R^3$, $R^4$ and $R^5$ are independently selected from the group consisting of alkyl groups of from 1 to 5 carbon atoms.

8. An electrochemical cell as set forth in claim 7 wherein the amount of said dye is effective to reduce the polarization of said cell upon charge or discharge.

9. An electrochemical cell as set forth in claim 6 wherein said lithium salt is selected from the group consisting of lithium perchlorate, lithium dithionite, lithium sulfate, lithium tetrafluoroborate, lithium hexafluorophosphate, lithium bromide, lithium aluminum chloride and lithium gallium chloride.

10. An electrochemical cell as set forth in claim 6 wherein said electrolyte additionally comprises at least one lithium-free electrolyte salt which is selected from the group consisting of salts containing metal cation complexes, quaternary ammonium salts, phosphonium salts, pyridinium salts and arsonium salts.

11. An electrochemical cell comprising in combination:
 (a) a lithium anode;
 (b) a cathode; and
 (c) a nonaqueous conductive liquid electrolyte which comprises a cathode depolarizer, at least one dissolved lithium salt and a minor amount of an organic cation, wherein said cathode depolarizer is sulfur dioxide and said organic cation has the formula:

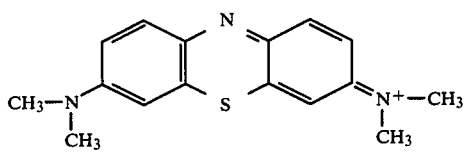

12. The electrochemical cell of claim 11 wherein said electrolyte comprises liquid sulfur dioxide having dissolved therein:
 (a) at least one salt containing said organic cation;
 (b) at least one lithium salt; and
 (c) at least one lithium-free salt other than the salt containing said organic cation which is substantially inert to lithium metal and sulfur dioxide.

13. The electrochemical cell of claim 12 wherein said lithium salt is selected from the group consisting of lithium perchlorate, lithium dithionite, lithium sulfate, lithium tetrafluoroborate, lithium hexafluorophosphate, lithium bromide, lithium aluminum chloride and lithium gallium chloride.

14. The electrochemical cell of claim 12 wherein said lithium-free salt is selected from the group consisting of salts containing metal cation complexes, quaternary ammonium salts, phosphonium salts, pyridinium salts and arsonium salts.

15. The electrochemical cell of claim 12 wherein said lithium salt comprises lithium perchlorate and said lithium-free salt comprises a quaternary ammounium salt of the formula:

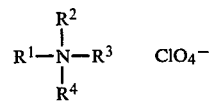

wherein $R^1$, $R^2$, $R^3$ and $R^4$ are independently selected from the group consisting of alkyl groups of from 1 to 10 carbon atoms.

16. The electrochemical cell of claim 12 wherein said lithium salt is selected from the group consisting of lithium perchlorate, lithium dithionite, lithium tetrafluoroborate and lithium hexafluorophosphate; and said lithium-free salt contains a cation selected from the group consisting of Mn(2,2'-dipyridyl)$_2^{++}$, Mn(2,2'-dipyridyl)$_3^{++}$ and Mn(1,10-phenanthroline)$_3^{++}$.

17. The electrochemical cell of claim 12 wherein the concentration of said organic cation in said electrolyte is in the range from about 0.01 to about 0.5 molar.

18. The electrochemical cell of claim 11 wherein said cathode is comprised of carbon.

* * * * *